United States Patent [19]

Monsorno et al.

[11] Patent Number: 5,034,851
[45] Date of Patent: Jul. 23, 1991

[54] MINIATURE MONOLITHIC MULTILAYERED CAPACITORS AND METHOD FOR TRIMMING

[75] Inventors: Richard V. Monsorno, Victor Insetta, both of Jacksonville, Fla.

[73] Assignee: American Technical Ceramics Corporation, Huntington Station, N.Y.

[21] Appl. No.: 527,302

[22] Filed: May 23, 1990

[51] Int. Cl.$^5$ .................... H01G 4/10; H01G 7/00
[52] U.S. Cl. .................... 361/321; 29/25.42
[58] Field of Search ....... 29/25.42; 361/321, 328–330, 361/277

[56] References Cited

U.S. PATENT DOCUMENTS

| | | | |
|---|---|---|---|
| 3,402,448 | 9/1968 | Heath | 29/25.42 |
| 3,694,710 | 9/1972 | Kirschner | 361/321 |
| 4,439,814 | 3/1984 | Rhodes | 361/321 |
| 4,856,102 | 8/1989 | Insetta et al. | 361/330 |

Primary Examiner—Donald A. Griffin
Attorney, Agent, or Firm—John P. White

[57] ABSTRACT

A monolithic multilayer capacitor of known capacitance has a body with six external walls and a plurality of spaced electrodes embedded in the body and spaced from a first one of the walls. Two spaced end walls have electrical terminations to which alternate electrodes are respectively connected. The electrode adjacent the first wall is spaced a first distance and the remaining electrodes are spaced apart a second distance. One or more slits in the first wall sever the first electrode adjacent to the wall leaving all the other electrodes intact and reducing the capacitor by predetermined amounts depending on the location of the slits.

12 Claims, 2 Drawing Sheets

MINIATURE MONOLITHIC MULTILAYERED CAPACITORS AND METHOD FOR TRIMMING

BACKGROUND OF THE INVENTION

1. Field of the Invention

This invention concerns miniature monolithic multilayered capacitors, and more particularly, concerns methods for adjusting or trimming the capacitance values of monolithic miniature capacitors.

2. Description of the Prior Art

One technique widely used for trimming a miniature multilayer capacitor employs an abrasive carried by a stream of air which cuts through the top of the capacitor down through many electrodes to form a code shpaed cavity with circular top. As the abrasive stream cuts its way through the active internal electrodes, the capacitance of the capacitor is diminished until the desired capacitance value is reached, at which time the abrasive stream is stopped. This technique has several disadvantages and difficulties. Typically many of the capacitors employ electrode films or plates which are spaced one mil apart. Thus many active areas of adjacent electrodes are exposed by the abrasion process. All the exposed adjacent areas have opposite polarities which affords many opportunities to short circuit. The abraded surfaces are quite rough and have embedded in them many foreign particles which affect desired electrical parameters and operating characteristics of the capacitors, in adverse and unpredictable ways. Sometimes almost half of the capacitor body is cut away to achieve the desired capacitance value. When so much material is removed, cracking often occurs, and the structure is weakened. Sometimes, glass or epoxy is poured into the hole which is used to seal (insulate) the exposed electrode edges. Since the ceramic dielectric is replaced by another material having different dielectric, mechanical and thermal characteristics troublesome problems in operation of the capacitors result. Often the high Q dielectric, or the dielectric chosen for its specific qualities is replaced by a different dielectric or non-dielectric material. This compromised the overall electrical properties and chosen parameters. Further complications are caused by the different materials, particularly at the interfaces, which can be sheared apart or separated during subsequent soldering, lead attachment, or other heat treatment operation. The joints are very fragile and fail when subject to mechanical shocks in operation. The nonhomogenous parts are also extremely vulnerable to thermal shock, which defect may be latent, so that the capacitor passes inspection by the manufacturer and ultimate user, but fails in circuit use.

It has been proposed for trimming purposes to use a laser beam to burn a hole in a capacitor to remove portions of the dielectric body and parts of adjacent electrode layers. This method has also proven to be troublesome. It is not possible to adjust precisely the desired change in capacitance value, and the invasive penetration of the dielectric body exposes the interior to ambient conditions which are not conducive to stable operation. When the holes are filled with glass, epoxy or other filler, the same objections and disadvantages are experienced as are mentioned above in connection with capacitors having holes formed by abrasion.

SUMMARY OF THE INVENTION

The above mentioned and other difficulties and disadvantages of adjusting the capacitance of fixed, fired, capacitors are avoided by the present invention where the miniature multilayered capacitors are manufactured with a first trimmable electrode layer spaced a short distance from the top of the capacitor body, with a second electrode layer spaced from the top electrode layer at a designated distance which is from 0.3 to 7 times the spacing of the first electrode layer from the top of the capacitor. Other lower electrode layers of the capacitor may be spaced apart in the usual manner below the second electrode layer. All the electrode layers are embedded in spaced parallel disposition in the fired ceramic body of the capacitor. Further according to the invention, trimming is accomplished by incising a fine slit or cut in the top of the capacitor just beyond and below the top trimming electrode. This fine slit can extend entirely across the capacitor body to disconnect a portion of the active area of the top electrode from the remainder of the electrode. This will have the effect of reducing the effective area of the top electrode, and thus diminishing the capacitance value of the capacitor.

By locating the slit anywhere along the length of the top electrode, it is possible to diminish the capacitance value in a very predictable way. For even better control of capacitance adjustment, a plurality of slits can be made closely spaced from one another to make the finest possible, precise adjustment of capacitance. It is also possible to machine away the disconnected electrode portion and dielectric portion of the capacitor body starting from the innermost slit. This results in a capacitor which is very stable electrically and mechanically. The new techniques described above can be made quickly, precisely with predictable results, and by use of relatively inexpensive equipment. Mechanical and electrical properties of the capacitor are not compromised in any way by use of this new technique.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 1:
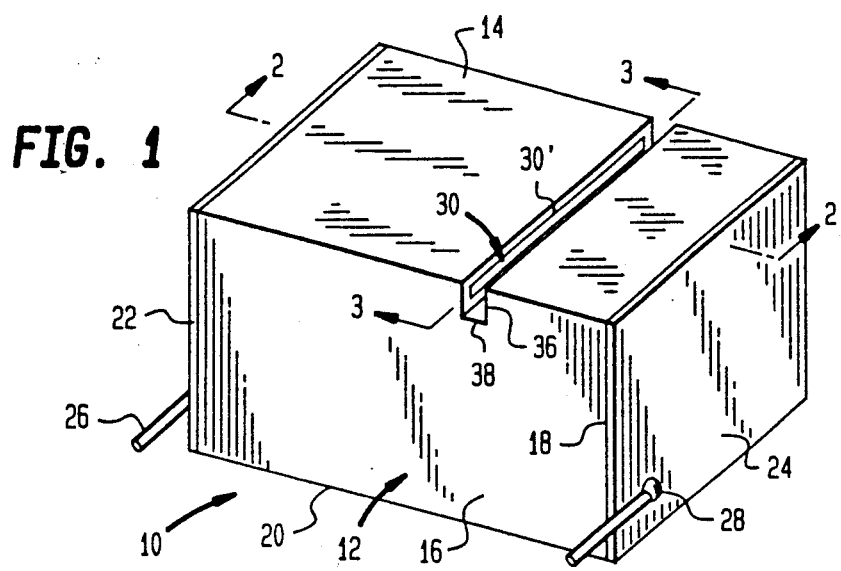
FIG. 1 is a perspective view on a greatly magnified scale of a miniature first capacitor having a single slit to adjust its capacitance, according to the invention.
Figure 2:
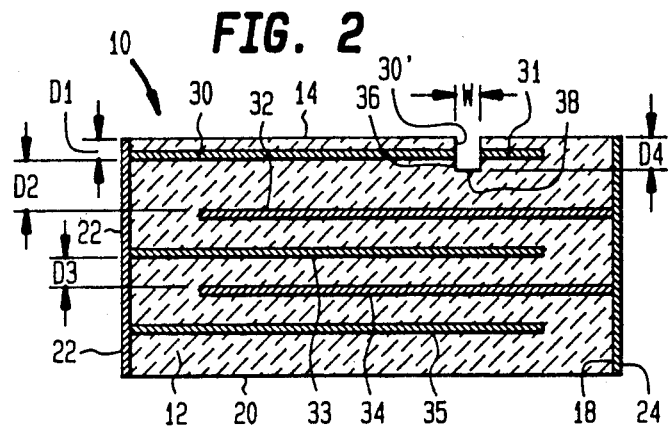
FIGS. 2 and 3 are vertical sectional views taken along lines 2—2 and 3—3 respectively of FIG. 1.
Figure 3:
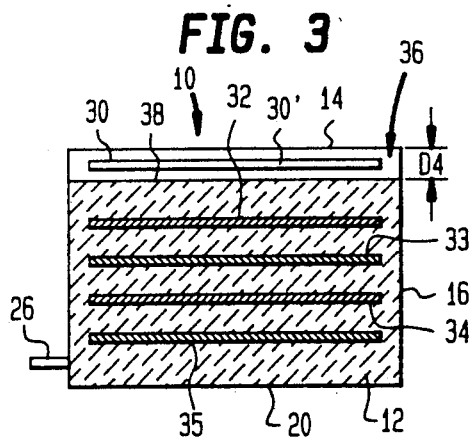

Referring now to the drawings wherein like reference characters designate like or corresponding parts throughout, there is illustrated in FIGS. 1, 2, and 3 a miniature capacitor designated generally by numeral 10, having a rectangular monolithic, ceramic, dielectric body 12 with a flat top rectangular surface 14, lateral sides 16, end faces 18 and a flat rectangular bottom wall 20. The end faces 18 are coated with electrically conductive films 22, 24 which serve as end terminations. A pair of leads 26 are respectively secured to the terminations 22, 24 by solder joints 28. To the extent described the capacitor structure is conventional.

Now according to the invention, a thin rectangular electrode 30 which may be about 0.1 mil in thickness is embedded in the ceramic body 12 adjacent to and slightly spaced from the upper surface 14. The spacing D1 may be, for example, about 3.0 mils. The electrode layer 30 begins at end termination 22 on the left as shown in FIG. 2, and the layer 30 terminates short of end termination 24. Electrode layer 30 is parallel to surface 14 and perpendicular to sides 16 and end faces 18. Below electrode 30 and embedded in the body 12 is a second electrode 32. The spacing D2 between electrodes 30 and 32 is a multiple of the spacing D1, and may range from 0.3 to 7 times the spacing D1. The electrode 32 is connected to end termination 24 and extends toward the left end terminating short of termination 22. Located below electrode 32 are further electrodes 33, 34, 35. Their size and spacing is determined by the desired capacitance value of the capacitor. For example the spacing D3 could range from one to five mils for electrodes which are about 0.1 mil in thickness. The overall length and L width of the capacitor body 12 could range from 100 to 150 mils, and the electrodes would have slightly smaller sizes.

In order to adjust or trim the capacitance of the capacitor 10, a single narrow cut or slit 36 is incised in the top of the capacitor body. The slit extends entirely through electrode 30 and if desired, through the lateral sides 16 of the body 12 to disconnect an electrode portion 31 from the electrode 30. The depth D4 of the cut 36 is about twice that of depth D1, so if depth D1 is about 3.0 mils, depth D4 will be about 6.0 mils, and the bottom 38 of the cut will be about 6.0 mils above the electrode 32, if the depth D2 is about 9.0 mils. The width W of the cut may be about 5.0 to 6.0 mils. As an example of what can be accomplished, (with a single cut 36 which is about 6.0 mils wide and 6.0 mils deep with spacing D1 of the electrode 30 about 3.0 mils, and the spacing D2 between the electrodes 30, 32 about 9.0 mils) about 4.0 picofarads (pf.) can be trimmed from a capacitor having an original capacitance of 12.0 pf. to bring the capacitance down to 8 pf. Basic electric parameters such as specified breakdown voltage limits are not appreciably changed, and the integrity of the dielectric is retained. It is not necessary to fill in the narrow slit 36 with any other material such as glass or epoxy, because external exposure of the cut end 30' of electrode 30 is negligible.

Figure 4:
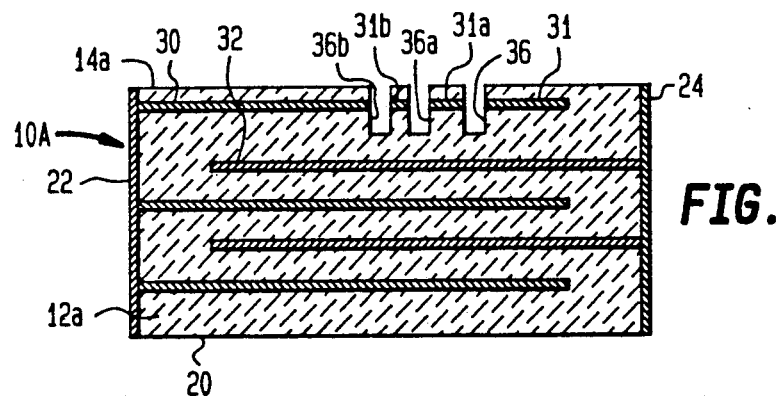
FIG. 4 is a vertical sectional view similar to FIG. 2 showing a second miniature capacitor whose capacitance is adjusted according to the invention.
Figure 5:
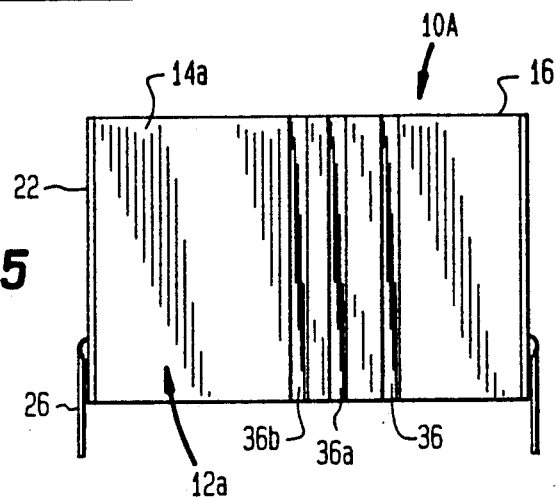
FIG. 5 is a top plan view on a reduced scale of the capacitor of FIG. 4.

In FIG. 4 and 5 is shown a second miniature capacitor 10A, which is similar to the capacitor 10 of FIGS. 1-3 and corresponding parts are identically numbered. In the capacitor 10A, after the slit 36 is made, further slits 36a and 36b are made in succession in a top 14a of a capacitor body 12a. Each additional slit causes a further decrease or trimming of the capacitance as further portions are disconnected from the top trimming electrode 30. The further slits 36a, 36b, can be made different distances apart from the first slit 36, so that the electrode portions 31a and 31b are progressively smaller viewing from right to left in FIG. 4. Thus as each further slit is made, a fine adjustment of the capacitance is made. It is of course possible to incise or slit the cuts 31, 31a, 31b, equal distances apart, since the capacitance change, with each slit, will be substantially linear. Making the slits progressively smaller allows finer and finer changes in capacitance, until the precise desired capacitance is obtained. All the slits 31, 31a, 31b, extend downwardly about one half the distance between electrodes 30 and 32. It will be noted that no cut or slit goes through more than one top electrode 31, as occurs in the prior capacitance adjustment methods where cylindrical holes or conical craters are made in the capacitor body.

Figure 6:
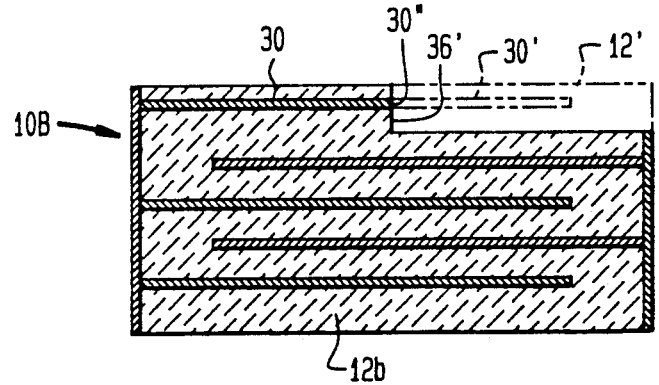
FIG. 6 a vertical sectional view similar to FIG. 2 showing a third miniature capacitor whose capacitance is adjusted according to the invention.
Figure 7:
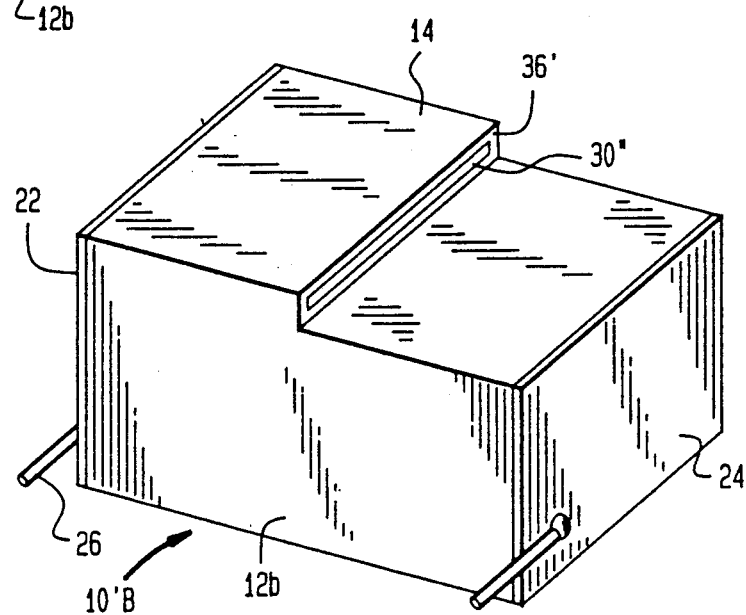
FIG. 7 is a perspective view on a reduced scale of the capacitor of FIG. 6.

FIGS. 6 and 7, show another modification of the invention. Here in a third miniature capacitor 10B all the excess dielectric material 12' and the excess electrode material 30' (indicated by dotted lines) has been removed from a body 12b. This leaves a step 36'. The step 36' and the corner cutout are obtained by grinding away the upper righthand corner of the capacitor body 12b. By removing the excess material 30' there is left a solid monolithic structure which is rugged and electrically stable. If desired a thin layer of epoxy or other dielectric material may be painted over the exposed edge 30' or 30" of the electrode 30.

Figure 8:
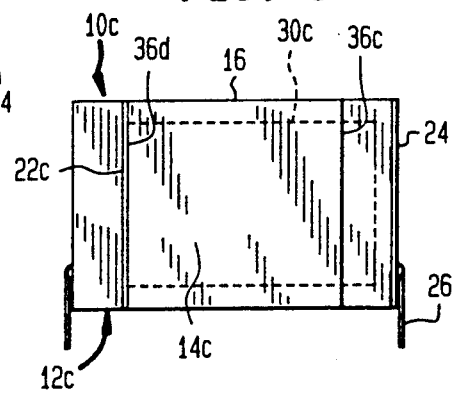
FIG. 8 is a top plan view on a magnified scale of a fourth miniature capacitor whose capacitance is adjusted according to the invention.
Figure 9:
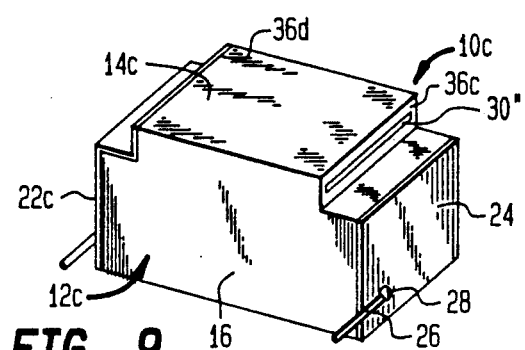
FIG. 9 is a perspective view of the capacitor of FIG. 8.

If desired two cuts can be made in the top of the capacitor, as illustrated in the fourth miniature capacitor 10C of FIGS. 8 and 9. Here the cuts are made near opposite ends of the top 14c of the capacitor body 12c to form steps 36c, 36d. The end termination 22c is extended to cover the left end of the electrode 30c which is exposed at the step 36d when the upper left corner is cut out. The upper right corner is cut out in the same manner, as illustrated in FIGS. 6 and 7, but the termination end 24 is not extended (if desired it may be). This procedure results in a mechanically balanced structure which may be desirable for some purposes, and it may extend the range of capacitance adjustments which the present method makes possible.

Although the cutting or slitting technique has been described in connection with a miniature capacitor it may be applicable to other electronic components and circuits where an electrode is buried beneath a surface and can be cut to disconnect part of the electrode, to change the electrical parameters or characteristics of the component or circuit.

The method described above is easy to accomplish quickly. It is precise and offers excellent predictable resolution. It provides an extremely reliable capacitor, without compromising electrical or mechanical properties of the component.

It should be understood that the foregoing relates to only a limited number of preferred embodiments of the invention which have been by way of example only, and that it is intended to cover all changes and modifications of the examples of the invention herein chosen for the purposes of the disclosure, which do not constitute departures from the spirit and scope of the invention.

What is claimed is:

1. A method for trimming a monolithic multilayer capacitor having a capacitance of a known magnitude and for reducing said magnitude to a desired other magnitude, comprising the steps of:

first fabricating a dielectric body with external walls, with two spaced electrical terminations respectively exposed on two of said external walls, and a plurality of spaced parallel electrodes embedded in said body and in direct electric circuit with different ones of said terminations and with a first of said electrodes embedded in said body a fixed distance from a third one of said external walls and with a second of said electrodes embedded in said body and spaced a fixed second distance from said first electrode, said second distance being in the range of 0.3 to 7 times said first distance;

second cutting through said third external wall to form a first slit only deep enough to disconnect completely an end portion of said first electrode from the remainder of said first electrode without severing said second electrode, so that said known magnitude of said capacitance is reduced a predetermined amount to said desired magnitude.

2. A method as recited in claim 1 wherein said second distance is greater than said first distance.

3. A method as recited in claim 1, comprising a third step of cutting through said third external wall to form a second slit spaced from said first slit and only deep enough to disconnect completely from the remainder of said first electrode another end portion thereof without severing said second electrode, so that said desired magnitude of said capacitance is further reduced another predetermined amount to another desired magnitude.

4. A method as recited in claim 3, comprising a fourth step of cutting through said third external wall to form a third slit spaced from said second slit and only deep enough to disconnect completely from said remainder of said first electrode a further end portion thereof without severing said second electrode, so that said other desired magnitude of said electrical capacitance is still further reduced a predetermined further amount to a further desired magnitude.

5. A method as recited in claim 4 wherein said first slit, said second slit and said third slit are each spaced apart equal distances so that said known magnitude of said capacitance is reduced in predetermined steps of equal magnitude by each of said second and said third slits.

6. A method as recited in claim 4 wherein said first slit, said second slit and said third slit are each spaced apart different distances so that said known magnitude of said capacitance is reduced in steps of predetermined magnitude coordinated with said spacings of second and said third slits.

7. A method as recited in claim 1 comprising a further step of removing a portion of said body to remove said disconnected portion of said first electrode, without removing and exposing any portion of said second electrode.

8. A method as recited in claim 1 comprising a further step of removing a corner portion of said body to remove said first end portion and said other end portion of said first electrode, without removing any portion of said second electrode while exposing only a free end of said first electrode remainder.

9. A method as recited in claim 1 wherein the remainder of said plurality of spaced electrodes are each respectively spaced apart said second distance.

10. A monolithical multilayer capacitor having a capacitance of known magnitude reduced a predetermined amount to a capacitance of other desired magnitude, comprising:

a dielectric body having six external walls;

two electrical terminations respectively exposed on two of said external walls which are oppositely spaced;

a first electrode embedded in said body a first fixed distance from a third one of said external walls and connected to one of said electrical terminations;

a second electrode embedded in said body a second fixed distance from said first electrode and connected to the other of said terminations, said second fixed distance being in the range of 0.3 to 7 times said first fixed distance;

a plurality of spaced further electrodes embedded in said body and spaced from said second electrode, and alternately connected respectively to one of said electrical terminations, each of said spaced further electrodes being spaced said second fixed distance from each other, to determine said capacitance of known magnitude; and a first slit formed in said third wall severing said first electrode without severing said second electrode, said slit being deep enough to sever completely an end portion of said first electrode from the remainder of said first electrode, so that said capacitance of known magnitude is reduced by said predetermined amount to said desired magnitude.

11. An electrical capacitor as recited in claim 10 wherein said body has a cut-out corner removing said end portion of said first electrode without exposing any portion of said second electrode.

12. An electrical capacitor as recited in claim 10, further comprising a second slit formed in said third wall and spaced from said first slit, said second slit being deep enough to sever completely another end portion of said remainder of said first electrode without severing said second electrode, so that said desired magnitude of capacitance is reduced by another predetermined amount to another desired magnitude of capacitance.

* * * * *